(12) United States Patent
Rose

(10) Patent No.: US 7,992,088 B2
(45) Date of Patent: Aug. 2, 2011

(54) METHOD AND SYSTEM FOR COPY AND PASTE TECHNOLOGY FOR STYLESHEET EDITING

(75) Inventor: Kristoffer H. Rose, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 1120 days.

(21) Appl. No.: 10/095,737

(22) Filed: Mar. 12, 2002

(65) Prior Publication Data

US 2003/0177449 A1 Sep. 18, 2003

(51) Int. Cl.
*G06F 17/00* (2006.01)
(52) U.S. Cl. ......... 715/724; 715/234; 715/236; 715/255
(58) Field of Classification Search ............... 715/523, 715/513, 724, 234–239; 707/10, 513, 101, 707/514, 1
See application file for complete search history.

(56) References Cited

U.S. PATENT DOCUMENTS

| | | | |
|---|---|---|---|
| 5,926,806 A | 7/1999 | Marshall et al. | 707/3 |
| 6,279,015 B1* | 8/2001 | Fong et al. | 715/523 |
| 6,502,112 B1* | 12/2002 | Baisley | 715/513 |
| 6,643,652 B2* | 11/2003 | Helgeson et al. | 707/10 |
| 6,678,867 B2* | 1/2004 | Fong et al. | 715/523 |
| 6,772,165 B2* | 8/2004 | O'Carroll | 707/101 |
| 2001/0018696 A1* | 8/2001 | Hori et al. | 707/513 |
| 2001/0032218 A1 | 10/2001 | Huang | |
| 2002/0035579 A1* | 3/2002 | Wang et al. | 707/513 |
| 2002/0147748 A1* | 10/2002 | Huang et al. | 707/517 |
| 2003/0167254 A1* | 9/2003 | Su et al. | 707/1 |
| 2005/0021513 A1* | 1/2005 | Vedula et al. | 707/3 |
| 2009/0089657 A1* | 4/2009 | Davis | 715/234 |
| 2010/0037130 A1* | 2/2010 | Jakubowski | 715/235 |

FOREIGN PATENT DOCUMENTS

WO 9414122 6/1994

OTHER PUBLICATIONS

Emmanuel Pietriga, VXT: a visual approach to XML transformations, 2001, ACM Press, pp. 1-10.*

(Continued)

*Primary Examiner* — Doug Hutton
*Assistant Examiner* — Quoc A Tran
(74) *Attorney, Agent, or Firm* — Steven M. Greenberg, Esq.; Carey, Rodriguez, Greenberg & Paul

(57) ABSTRACT

A method (and structure) for editing elements of a first document based on elements of a second document, wherein the elements of the first have a template structure with each template including at least one match condition, the match condition being an expression in the template that describes a subset of nodes that are matched in a tree structure, and wherein the elements of the second document have a tree structure to which this matching is applicable, including comparing a first user-selected fragment of an element from the second document with a second user-selected fragment of an element from the second document to determine if a match condition exists that describes the relation between templates in the first document for which the match condition matches the two user-selected fragments of the second document and permitting at least one of a plurality of predefined editing operations on the first document if such a match condition exists.

18 Claims, 3 Drawing Sheets

OTHER PUBLICATIONS

Roisin et al. "Implementing the Cut and Paste Operation in a Structured Editing System" Published Aug. 19, 1996 (WWW document) pp. 1-18.*

Becker, [xsl] merging XML documents <eom>, Jan. 31, 2001, pp. 1-2 http://www.xsit.com/html/xsl-list/2001-01/msg0153.html.

Leslie, "Transforming documentation from the XML doctypes used for the apache website to DITA", Oct. 21, 2001, ACM Press, New York, pp. 157-164.

Villard, "Authoring Transformations by Direct Manipulation for Adaptable Multimedia Presentations", ACM Press, 2001, pp. 125-134.

* cited by examiner

METHOD AND SYSTEM FOR COPY AND PASTE TECHNOLOGY FOR STYLESHEET EDITING

CROSS-REFERENCE TO RELATED APPLICATIONS

The present Application is related to the following co-pending applications:

U.S. patent application Ser. No. 10/095,827, filed on Mar. 12, 2002, to Adler et al., entitled "METHOD AND SYSTEM FOR STYLESHEET-CENTRIC EDITING";

U.S. patent application Ser. No. 10/095,797, filed on Mar. 12, 2002, to Adler et al., entitled "METHOD AND SYSTEM FOR STYLESHEET RULE CREATION, COMBINATION, AND REMOVAL TECHNOLOGY"; and U.S. patent application Ser. No. 10/096,379, filed on Mar. 12, 2002, to Clarke et al., entitled "METHOD AND SYSTEM STYLESHEET EXECUTION INTERACTIVE FEEDBACK", all assigned to the present assignee, and all incorporated herein by reference.

BACKGROUND OF THE INVENTION

1. Field of the Invention

The present invention relates generally to a method of providing a familiar word processor copy-and-paste paradigm for editing template-based programs that transform tree structures such as documents in the eXtensible Mark-up Language (XML) format. As an exemplary embodiment, an XSLT (eXtensible Style Language Transformations) stylesheet editor incorporates this copy-and-paste method as one of its additional features.

2. Description of the Related Art

A conventional method of deploying an XML processor written as an XSLT stylesheet is shown in overview in FIG. 1. An XSLT stylesheet 10 includes a set of rules that describe how to process elements of an input XML document 11 to transform these into elements of the XML output document 12. The actual transformation is executed by an XSLT-based transformation engine 13 that reads the rules of the XSLT stylesheet and executes the corresponding transformation of 11 to 12. In this way the stylesheet 10 and transformation engine 13 together form an XML processor whose operation is fully defined by the XSLT stylesheet, i.e., each rule of the stylesheet 10 matches one or more elements in the input document and describes the actions to take and the output to produce when a matching element is found.

An XSLT stylesheet expresses directly how a source XML is transformed into a result XML for presentation or further processing. Execution of an XSLT stylesheet is non-sequential. It is not like a program written in conventional programming languages such as C, C++, Java, Basic, FORTRAN, Cobol, etc. This, however, makes the development of XSLT stylesheets very different from development of XML processing programs in conventional programming languages such as C, C++, Java, or Visual Basic. It has a very different execution paradigm than those to which they are accustomed.

This means that tools for understanding execution of an XSLT stylesheet can be very different than similar tools for sequential programming languages, such as "debuggers." The major task in developing XSLT stylesheets is structuring the stylesheet into rules that fit the source data to be processed. Creating or changing the rules in an XSLT stylesheet is difficult and complex because of the need for the user to understand the relationship between the input document, the stylesheet rules and the output document.

Current editors for XSLT stylesheets fail to provide features and tools that facilitate editing of specific syntax-based documents such as the tree structure of XML. More specific to the present invention, current XSLT stylesheet editors fail to provide a copy-and-paste feature for editing of an XSLT stylesheet based on reorganisation of visual elements of the XML output structure.

SUMMARY OF THE INVENTION

In view of the foregoing problems, drawbacks, and disadvantages of the conventional systems, it is an object of the present invention to provide a structure (and method) that incorporates the familiar word processor copy-and-paste paradigm for editing template-based programs that transform tree structures such as eXtensible Mark-up Language (XML) documents.

It is, therefore, an object of the present invention to teach a structure and method for copy-and-paste editing operations in a template-based environment.

It is another object of the present invention to teach an exemplary embodiment of this copy-and-paste method as incorporated into an XSLT stylesheet editor.

To achieve the above goals and objectives, a method (and a structure and a signal-bearing medium) is disclosed herein for editing elements of a first document based on elements of a second document, wherein the elements of the first have a template structure with each template including at least one match condition, the match condition being an expression in the template that describes a subset of nodes that are matched in a tree structure, and wherein the elements of the second document have a tree structure to which this matching is applicable, including comparing a first user-selected fragment of an element from the second document with a second user-selected fragment of an element from the second document to determine if a match condition exists that describes the relation between templates in the first document for which the match condition matches the two user-selected fragments of the second document and permitting at least one of a plurality of predefined editing operations on the first document if such a match condition exists.

The XSLT editor, as described herein and the copending applications listed above, provides new ways of looking at an XSTL stylesheet that allows for better understanding of the relationship between the input document 11, the stylesheet rules 10, and the output document 12.

More specifically, as shown in FIG. 2A, the new editor provides a stylesheet centric XSL editor 20 in which a user interacts with a GUI that includes a WYSIWYG ("what you see is what you get") output result view 22 of the output document 12 as executed by transformation engine 13. The user also can view a sample view 21 of the input XML source 11. The editor 20 is based on a model 23 which is a logical construct of the underlying XSL stylesheet 10.

Unlike the conventional paradigm described earlier for editing XSL stylesheets, the user does not have to directly modify the text of the stylesheet file. Instead, the user interacts with the stylesheet through stylized GUI representations 21, 22, 24 of the underlying XML documents and the model 23. The present invention provides a useful additional feature to this basic editor by making it possible for users to employ the familiar copy-and-paste paradigm within a view of a generated stylesheet result to effect editing within the used stylesheet.

Although the present invention was developed specifically for the XSLT editing environment, there is no intent to confine its applicability thereto. It can be used as an editing tool on any "template-based" language that processes structured data such as XML. An example of a different template-based programming language for transforming tree-structured data such as XML is XDuce.

The present invention combines well with the inventions of the separately filed disclosures to provide synergy unachievable in isolation. Concerning U.S. patent application Ser. No. 10/096,379 entitled "Method and System for Stylesheet Execution Interactive Feedback Technology", the user interaction is much improved when the result nodes that will be affected by a Cut or Copy, as described by the present invention, are highlighted in a WYSIWYG fashion, as described by that invention. Concerning U.S. patent application Ser. No. 10/095,797 entitled "Method and System for Stylesheet Rule Creation, Combination, and Removal Technology", the "refinement" technique of that invention provides a very useful way to restrict the amount of material that is Cut or Copied by the present invention. Concerning U.S. patent application Ser. No. 10/095,827 entitled "Method and System for Stylesheet-Centric Editing", the Cut, Copy, and Paste operations of the present invention fit well with the basic editor described therein.

The present invention provides the familiar wordprocessor copy-and-paste paradigm into the editing process for "template-based" programming languages that transform tree structures such as eXtensible Mark-up Language (XML) documents This feature, therefore, greatly enhances the editing of programs, such as XSL or XSLT stylesheets, in these "template-based" environments.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
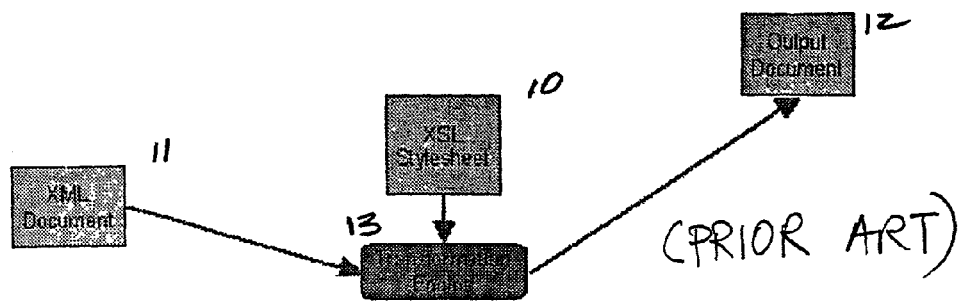
FIG. 1 shows an overview of XML transformation using an XSL stylesheet and the conventional XSL editing process.
Figure 2A:
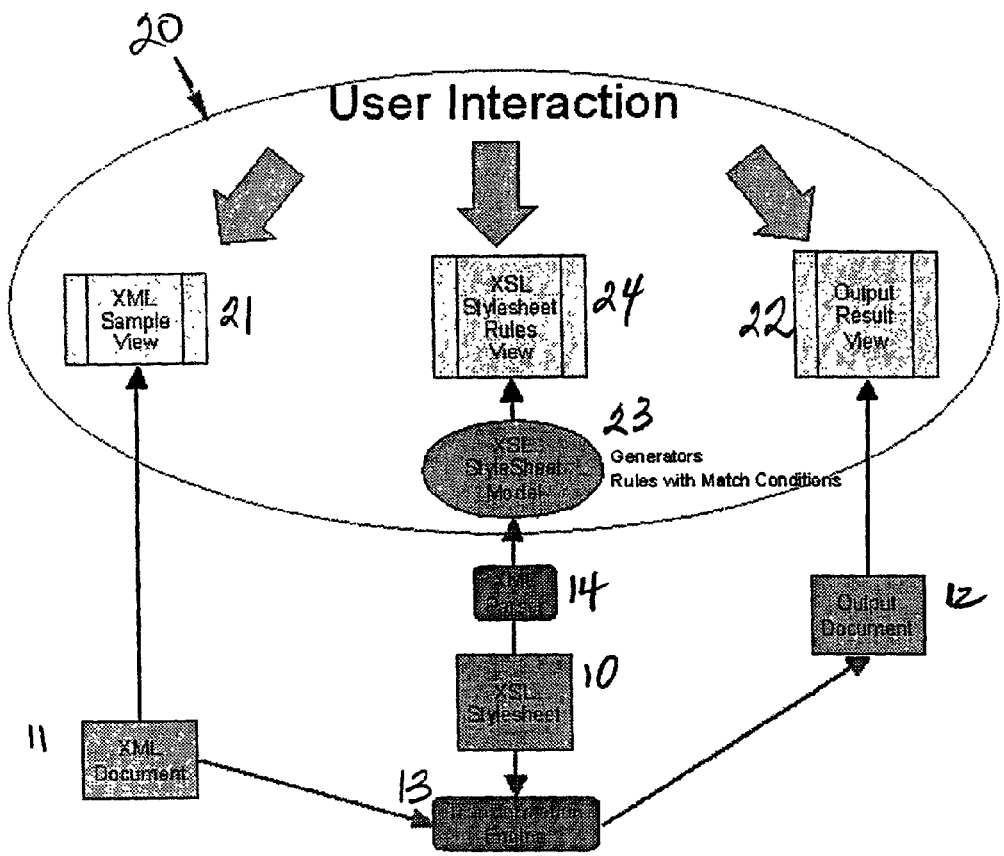
FIG. 2A shows an overview of a basic XSL editor into which the present invention is exemplarily incorporated.

Referring now to the drawings, and more particularly to FIG. 2A, an exemplary embodiment of the present invention will now be described as being an editing tool that extends the familiar copy-and-paste paradigm common to most word processors into the editing environment of template-based programs for transforming tree-structured syntax such as XML.

An XSLT stylesheet transforms source XML to result XML. The structure and content of the result are determined by the source as interpreted, sampled, or elaborated by the stylesheet.

Source-1+Stylesheet==>Result-1

Source-2+Stylesheet==>Result-2

An XML contains elements, attributes, and text. A stylesheet contains rules. Rules match elements, attributes, and/or text in the source. When a rule matches, it executes in context of the matched source. It produces some result XML influenced by that context.

XML may be represented as a "tree" of "nodes." Each node of the tree is an element or text. The node at the top of the tree is the "root." All of the nodes connected to the root are the "children" of the root, which is their "parent."

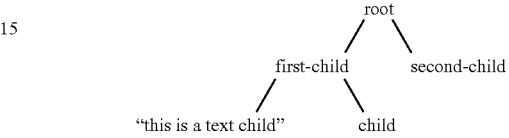

An XSLT stylesheet is itself written as XML. Each rule in the stylesheet is a node in a tree.

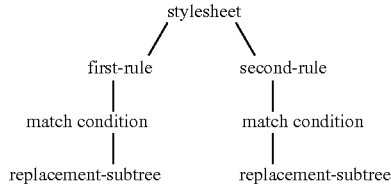

Each rule is applicable whenever processing reaches a source XML node that matches its "match condition"; default rules are defined by the environment such that all nodes are matched. Match conditions of XSLT are expressed in the W3C XPath standard language.

Cut, Copy, and Paste in Stylesheet Output

Traditional cut, copy, and paste operations involve the following steps. For cut or copy operations, the data that is selected is copied over into a special "cut buffer", and for cut it is then deleted from the edited document. For a paste operation, a copy of what is in the "cut buffer" is inserted at the location of the paste cursor.

The present invention describes what to store in the "cut buffer" and how to interpret it on paste as a stylesheet modification to achieve an effect similar to copy and paste in the result XML. Variant cut and paste situations are dealt with afterwards.

Before enumerating the necessary cases, below is given some definitions relative to the present invention.

Convention: Any word prefixed with "xsl:" below refers to an instance of the element of that name in the XSLT specification.

Definition: A match condition is an expression that describes a subset of all the nodes of the XML sources that are being processed; in that case it is said that those source nodes match the match condition. A match condition corresponds to the nodes matching an XSLT "LocationPathPattern" match pattern or the nodes selected by an XPath "AbsoluteLocationPath" node set expression.

Definition: Given two match conditions MC1 and MC2, the relocation from MC1 to MC2 is, if it exists, the XPath node "RelativeLocationPath" (or just "selection") expression S that from the source nodes matching MC1 builds the node set of the source nodes matching MC2. Conversely it can be said that MC2 is the result of MC1 relocated by S.

Definition: A template fragment is a subtree within the template body of an xsl:template.

Definition: The match condition of a template or template fragment is defined recursively over XSLT as follows:

For xsl:template rules with a match attribute XPath pattern, it is a match condition describing the nodes that the pattern matches in the source XML.

For any xsl:construction with a select or test attribute with a RelativeLocationPath XPath node set expression, the match condition is the match condition of the containing construction relocated by the select or test XPath.

For any xsl:construction with a select or test attribute with an AbsoluteLocationPath XPath node set expression, the match condition is the match condition corresponding to the AbsoluteLocationPath.

For any other XSLT template fragment, it is the match condition of the parent template fragment.

The logic underlying the copy-and-paste actions of the present invention are described below.

Cut Action

Cut is possible with the following state information:
  a. A selected stylesheet template fragment; and
  b. A selected set of source nodes that must all match the match condition of the stylesheet template fragment.

On cut, a cut-buffer structure is created with information needed to make it possible to create a template fragment that recreates the XML result nodes generated by the selected template fragment.

This is achieved by storing the following information in the cut-buffer:
  a. A proto-paste which is a copy of the selected stylesheet template fragment; and
  b. An origin match condition describing the selected set of source nodes.

After the cut-buffer structure has been created, the selected stylesheet template fragment is removed from the stylesheet.

Copy Action

Copy is possible with the following state information:
  a. A selected stylesheet template or template fragment; and
  b. A selected set of source nodes that must all match the match condition of the stylesheet template fragment.

On copy a cut-buffer structure is created with information needed to make it possible to create a template fragment that recreates a copy of the XML result nodes generated by the selected template or template fragment. This is achieved by storing the following information in the cut-buffer:
  a. A proto-paste depending on the kind of selected template or template fragment:
    i. For an xsl:template rule with a match attribute the proto-paste is an xsl:apply-templates with a select="." attribute;
    ii. For all other template fragments the proto-paste is a copy of the entire fragment;
  b. And, the origin match condition describing the selected set of source nodes.

Paste Action

Paste is possible with the following state information:
  a. A cut-buffer structure as above;
  b. A paste location "place-holder" in a stylesheet template body (such as identified by a "cursor"); and
  c. A selected set of source nodes that must all match the match condition of the stylesheet template of template fragment containing the place-holder.

On paste the cut-buffer structure is used to insert at the paste location a template fragment that creates a copy of the XML result nodes generated by the originally cut or copied template or template fragment. Specifically a recursive copy of the proto-paste is inserted into the paste location where every select attribute of each xsl:apply-templates, xsl:for-each, xsl:copy-of xsl:value-of, and xsl:copy, is adjusted such that the match condition obtained by the origin match condition relocated by the original select attribute Xpath is the same as the match condition obtained by the destination match condition relocated by the replacement select attribute Xpath.

Figure 2B:
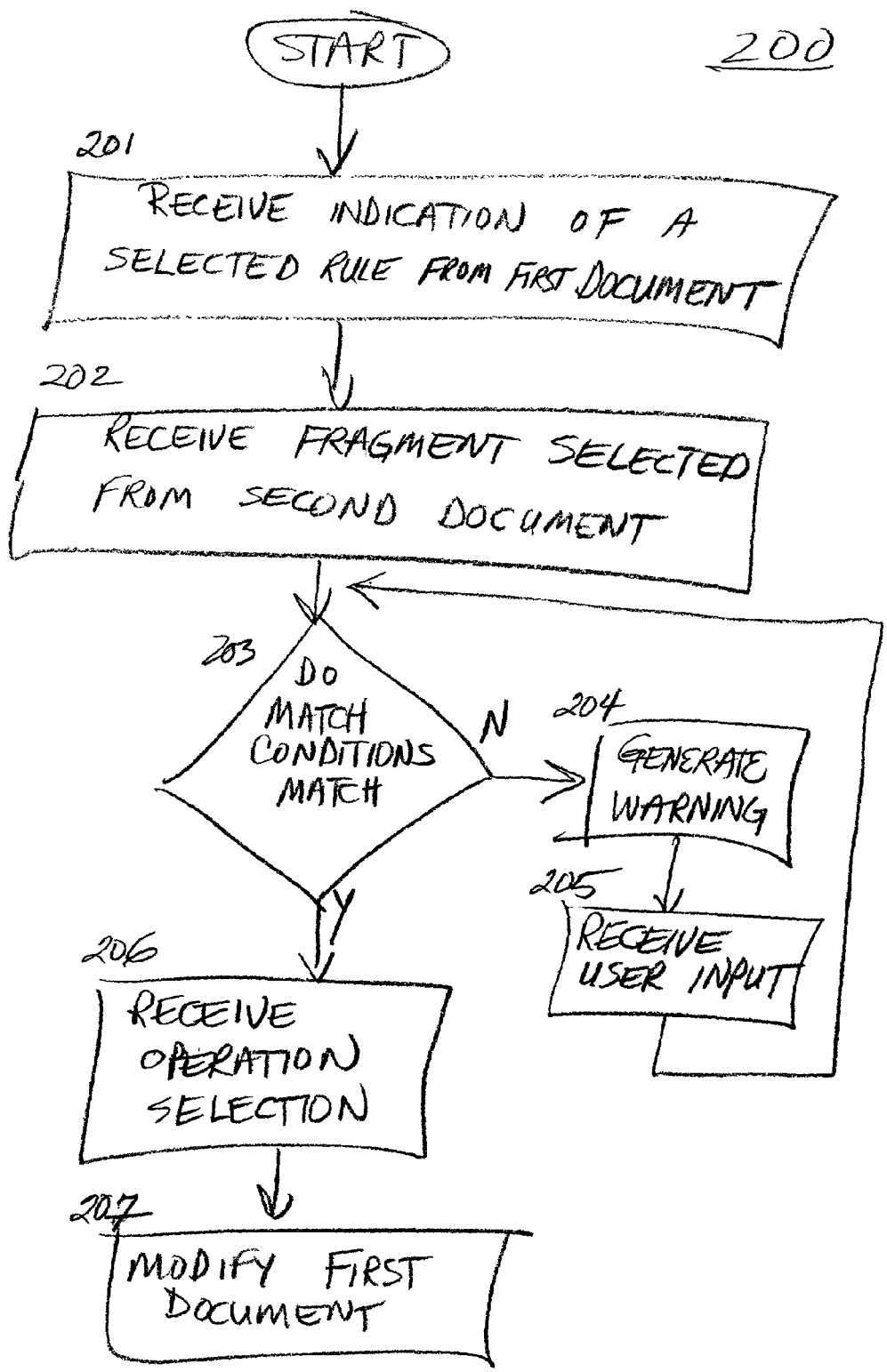
FIG. 2B illustrates a flowchart for a preferred embodiment of the present invention.

FIG. 2B shows an exemplary flowchart 200 of the process described above. In step 201 a user-input indicates which rule on the stylesheet is to be modified by a cut, copy, or paste editing operation. In step 202 another user input provides a fragment from either the XML source or result document. The selected fragment is compared to the match condition of the selected stylesheet template in step 203. If there is no match, the editor can generate an appropriate warning and allow the user to make another selection (steps 204, 205). If there is a match, the editor then receives in step 206 a selection of which editing operation is to be executed and performs the selected operation to the stylesheet in step 207.

Remarks

The effect of the above is that when the user selects a few nodes in a source XML as well as a template or template fragment that is processing those nodes then they can use Copy and Paste to create more applications of the rule in the stylesheet corresponding to more occurrences of the generated nodes in the result XML, and if they select a template fragment that is processing those nodes, then they can use Cut and Paste to move the generation of the result nodes to a different location in the result XML.

EXAMPLES

Following are examples which illustrate the concept of the present invention. An example source XML document is first given below.

```
<?xml version="1.0"?>
<flight-list>
    <flight>
        <number>742</number>   ----------------------------10
        <leg-list>
            <leg>
                <dep><city code="PVD">Providence</city><time>9:24</time></dep>
                <arr><city code="ORD">Chicago</city><time>10:38</time></arr>
                <remark>Short transfer time. </remark>
            </leg>
            <leg>
```

```
                <dep><city
code="ORD">Chicago</city><time>11:14</time></dep>
                <arr><city code="SJC">San Jose</city><time>12:32</time></arr>
            </leg>
        </leg-list>
    </flight>
    <flight>
        <number>875</number>
        <leg-list>
            <leg>
21----------   <dep><city code="NRT">Tokyo</city><time>16:55</time></dep>
                <arr><city code="BKK">Bangkok</city><time>21:30</time></arr>
            </leg>
        </leg-list>
    </flight>
    <flight>
        <number>904</number>
        <leg-list>
            <leg>
                <dep><city code="JFK">New York</city><time>20:45</time></dep>
                <arr><city code="LHR">London</city><time>08:55</time></arr>
            </leg>
        </leg-list>
    </flight>
    <flight>
        <number>979</number>
        <leg-list>
            <leg>
                <dep><city code="LHR">London</city><time>18:00</time></dep>
                <arr><city code="JFK">New York</city><time>20:50</time></arr>
            </leg>
        </leg-list>
    </flight>
</flight-list>
```

Example 1

Selecting the "number" node 10 (with 742) in the sample source XML and the <xsl:template match="number"> . . . </xsl:template> template 11 in the following stylesheet:

```
<?xml version="1.0" encoding="utf-8"?>
<xsl:style sheet
    xmlns="http://www.w3.org/1999/xhtml"
    xmlns:xshz="http://www.w3.org/1999/XSL/Transform"
    version="1.0">
    <xsl:template match="/flight-list">
        <html>
            <head>
                <title>Flights</title>
            </head>
            <body>
                <p>
                    <h1>Flights: </h1>
                <p>
                <xsl:apply-templates/>
                <h5>Summary</h5>
                                    -------------------------13
            </body>
        </html>
    </xsl:template>
    <xsl:template match='number'>           ---------------11
        <xsl:apply-templates/>
    </xsl:template>
</xsl:stylesheet>
``` enables (just) the copy action. Activating copy and then selecting the flight-list source node 12 and a paste location 13 (just after the <h5>Summary</h5> in the stylesheet) make the paste action active. Activating paste changes the stylesheet to:

```
<?xml version="1.0" encoding="utf-8"?>
<xsl:style sheet
    xmlns="http://www.w3.org/1999/xhtml"
    xmlns:xshz="http://www.w3.org/1999/XSL/Transform"
    version="1.0">
    <xsl:template match="/flight-list">
        <html>
            <head>
                <title>Flights</title>
            </head>
            <body>
                <p>
                    <h1>Flights: </h1>
                <p>
                <xsl:apply-templates/>
                <h5>Summary</h5>
                <xsl:apply-templates select='flight/number'/>   --------------14
            </body>
        </html>
    </xsl:template>
    <xsl:template match='number'>
            <xsl:apply-templates/>
    </xsl:template>
</xsl:stylesheet>
``` with the effect 14 of inserting just the numbers under the summary heading. The select='flight/number' attribute is the relocation from the destination source node's match condition that can be written as the XPath/flight-list to the original selection's match condition that can be written as the XPath/flight-list/flight/number.

Example 2

If instead the stylesheet were:

```
<?xml version="1.0" encoding="utf-8"?>
<xsl:style sheet
    xmlns="http://www.w3.org/1999/xhtml"
    xmlns:xsl="http://www.w3.org/1999/XSL/Transform"
    version="1.0">
    <xsl:template match="/flight-list">
        <html>
            <head>
                <title>Flights</title>
            </head>
            <body>
                <p>
                    <h1>Flights: </h1>
                <p>
                <xsl:apply-templates/>
                <h5>Summary</h5>
                <xsl:for-each select='flight'>
                <p><b><xsl apply-templates select='number'/></b>: ----------22
                    <xsl:apply-templates select='legs/leg[1]/dep/city'/>to
                    <xsl:apply-templates select='legs/leg[last( )]/arr/city'/></p>
                </xsl:for-each>
                <h5>Arrival cities</h5> ---------------------------20
                <p></p> -----------------------------------------23
            </body>
        </html>
    </xsl:template>
</xsl:stylesheet>
``` then one way to fill out "Arrival cities" 20 is to select a city source such as Tokyo 21 (which is under a dep under a last leg on the XML source) along with the <xsl:apply-templates select='legs/leg[last( )]/arr/city'/> stylesheet fragment 22. Then we can copy and then select flight-list and a paste location 23 in the empty <p></p> to make paste change the stylesheet to (see item 24 specifically):

```
<?xml version="1.0" encoding="utf-8"?>
<xsl:stylesheet
    xmlns="http://www.w3.org/1999/xhtml"
    xmlns:xsl="http://www.w3.org/1999/XSL/Transform"
    version="1.0">
    <xsl:template match="/flight-list">
        <html>
            <head>
                <title>Flights</title>
            </head>
            <body>
                <p>
                    <h1>Flights: </h1>
                </p>
                <xsl:apply-templates/>
                <h5>Summary</h5>
                <xsl for-each select='flight'>
                    <p><b><xsl:apply-templates select'number'/></b>:
                        <xsl:apply-templates select='legs/leg[1]/dep/city'/> to
                        <xsl:apply-templates select='legs/leg[last( )]/arr/city'/></p>
                </xsl:for-each>
                <h5>Arrival cities</h5>
24----------<p><xsl:apply-templates select='flight/legs/leg[last( )]/arr/city'/></p>
            </body>
        </html>
    </xsl:template>
</xsl:stylesheet>
``` where flight/legs/leg[last( )]/arr/city is the relocation from /flight-list to /flight-list/flight/legs/leg[last( )]/arr/city.  30

Example 3

If the stylesheet were:

```
<?xml version="1.0" encoding="utf-8"?>
<xsl:stylesheet
xmlns="http://www.w3.org/1999/xhtml"
xmlns:xsl="http://www.w3.org/1999/XSL/Transform"
version="1.0">
<xsl:template match="/flight-list">
        <html>
            <head>
                <title>Flights</title>
            </head>
            <body>
                <p>
                    <h1>Flights: </h1>
                </p>
                <xsl:apply-templates/>
                <h5>Summary</h5>
                <xsl:for-each select='flight'>
                    <p><b><xsl:apply-templates select='number'/></b>:
                        <xsl apply-templates select='legs/leg[1]/dep/city'/>to
                        <xsl:apply-templates select='legs/leg[last( ]/arr/city'/></p>
                </xsl:for-each>
                <h5>Arrival cities</h5>
                <p><xsl:for-each select='flight/legs/leg[last( )]/arr'> ---------30
                    </xsl :for-each></p>
            </body>
        </html>
    </xsl:template>
<xsl stylesheet>
``` then the same output is achieved by a Copy with the same source and stylesheet selections as before followed by a Paste with the same source but the paste location 30 in <xsl:for-each select='flight/legs/leg[last( )]/arr'>. Now the produced stylesheet is (see item 31):

```xml
<?xml version="1.0" encoding="utf-8"?>
<xsl:stylesheet
xmlns="http://www.w3.org/1999/xhtml"
xmlns:xsl="http://www.w3.org/1999/XSL/Transform"
version="1.0">
<xsl:template match="/flight-list">
    <html>
        <head>
            <title>Flights</title>
        </head>
        <body>
            <p>
                <h1>Flights: </h1>
            </p>
            <xsl:apply-templates/>
            <h5>Summary</h5>
            <xsl:for-each select='flight'>
                <p><b><xsl:apply-templates select='number'/></b>:
                <xsl:apply-templates select='legs/leg[1]/dep/city'/>to
                <xsl:apply-templates select='legs/leg[last( )]/arr/city'/></p>
            </xsl:for-each>
            <h5>Arrival cities</h5>
            <p></p>
            <p><xsl:for-each select='flight/legs/leg[last( )]/arr'>
                <xsl:apply-templates selecP='city'/> ----------------31
            </xsl:for-each></p>
        </body>
    </html>
</xsl:template>
</xsl:stylesheet>
```

Exemplary Hardware Implementation

Figure 3:
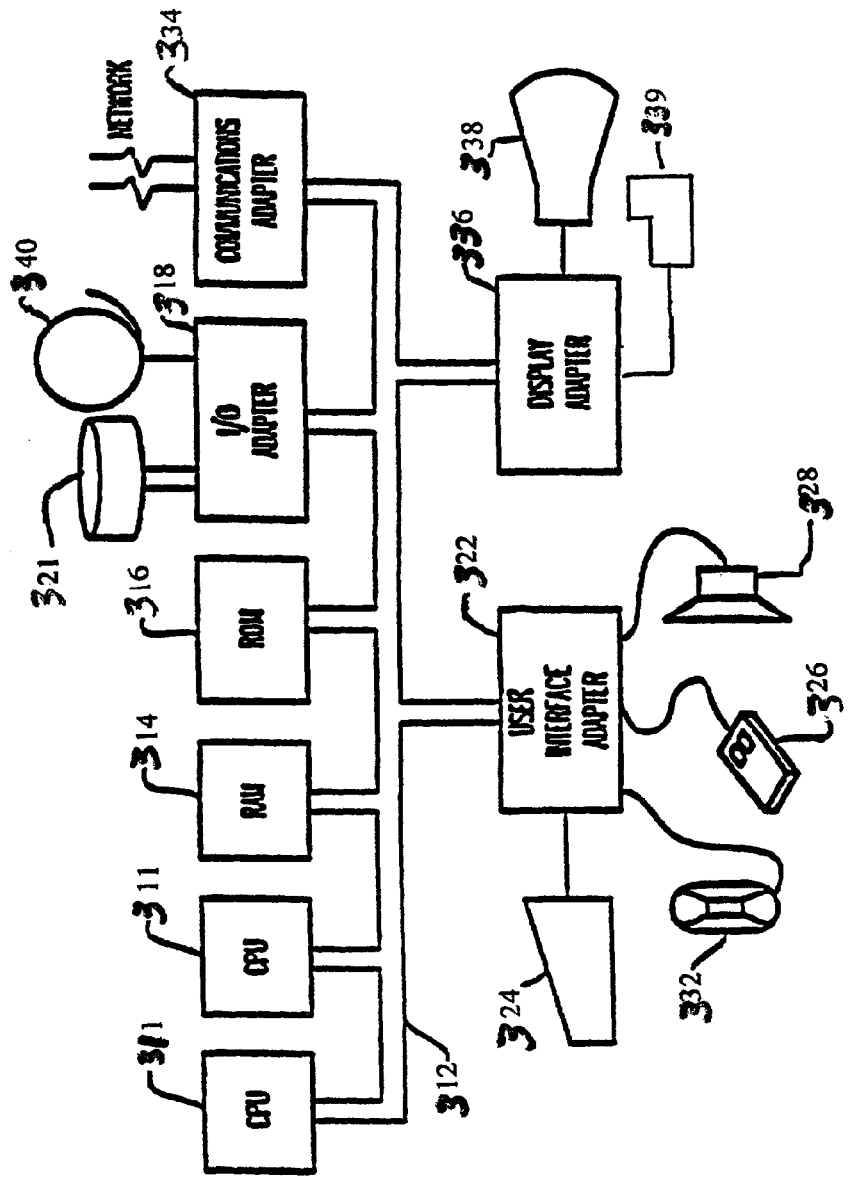
FIG. 3 illustrates an exemplary hardware/information handling system 300 for incorporating the present invention therein.

FIG. 3 illustrates a typical hardware configuration of an information handling/computer system in accordance with the invention and which preferably has at least one processor or central processing unit (CPU) 311.

The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the method of the invention.

Figure 4:
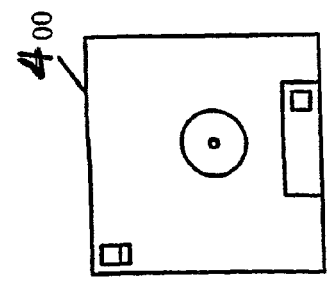
FIG. 4 illustrates a signal bearing medium 400 (e.g., storage medium) for storing steps of a program of a method according to the present invention.

This signal-bearing media may include, for example, a RAM contained within the CPU 311, as represented by the fast-access storage for example. Alternatively, the instructions may be contained in another signal-bearing media, such as a magnetic data storage diskette 400 (FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), or paper "punch" cards, In an illustrative embodiment of the invention, the machine-readable instructions may comprise software object code, compiled from a language such as "C", etc.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer-implemented method of editing elements of a first document based on elements of a second document, said elements of said first document having a template structure, each said template comprising at least one match condition, said match condition being an expression in said template that describes a subset of nodes that are matched in a tree structure, said second document containing a tree structure to which said matching is applicable, comprising:

comparing a first selected fragment of an element from said first document with a second selected fragment of an element from said second document to determine if a match condition exists that describes the relation between templates in said first document, said match condition matching said first selected fragment and said second selected fragment;

upon said match condition existing, receiving a predefined editing operation from a user; and performing the predefined editing operation by modifying the template structure of the elements of the first document, wherein the performing comprises:

responsive to receiving a copy operation from the user, determining if the first selected fragment is a template rule with a match attribute;

if the first selected fragment is a template rule with a match attribute, storing in a cut buffer a apply-templates rule with a select attribute and an origin match condition describing the second selected fragment;

if the first selected fragment is not a template rule with a match attribute, storing in a cut buffer a copy of the first selected fragment and an origin match condition describing the second selected fragment.

2. A computer having an editor for editing elements of a first document based on elements of a second document, said elements of said first document having a template structure, each said template comprising at least one match condition, said match condition being an expression in said template that describes a subset of nodes that are matched in a tree structure, said second document containing a tree structure to which said matching is applicable, said editor comprising:

an input module for receiving a first selected fragment from said first document and a second selected fragment from said second document;

a comparator for comparing a first selected fragment of an element from said second document with a second selected fragment of an element from said second document to determine if a match condition exists that describes the relation between templates in said first document, said match condition matching said first selected fragment and said second selected fragment;

an input module for receiving a predefined editing operations from a user upon said match condition existing; and an enabling module for performing the predefined editing operation by modifying the template structure of the elements of the first document, wherein said enabling module further determines if the first selected fragment is a template rule with a match attribute responsive to the input module receiving a copy operation from the user;

stores in a cut buffer a apply-templates rule with a select attribute and an origin match condition describing the second selected fragment stores if the first selected fragment is a template rule with a match attribute; and stores in a cut buffer a copy of the first selected fragment and an origin match condition describing the second selected fragment if the first selected fragment is not a template rule with a match attribute.

3. A computer program product including computer-readable storage medium having stored therein computer usable program code for editing elements of a first document based on elements of a second document, said elements of said first document having a template structure, each said template comprising at least one match condition, said match condition being an expression in said template that describes a subset of nodes that are matched in a tree structure, said second document containing a tree structure to which said matching is applicable, the computer usable program code, which when executed by a computer hardware device, causing the computer hardware device to perform comparing a first selected fragment of an element from said first document with a second selected fragment of an element from said second document to determine if a match condition exists that describes the relation between templates in said first document, said match condition matching said first selected fragment and said second selected fragment;

upon said match condition existing, receiving a predefined editing operation from a user; and performing the predefined editing operation by modifying the template structure of the elements of the first document determining if the first selected fragment is a template rule with a match attribute responsive to the input module receiving a copy operation from the user;

storing in a cut buffer a apply-templates rule with a select attribute and an origin match condition describing the second selected fragment stores if the first selected fragment is a template rule with a match attribute; and storing in a cut buffer a copy of the first selected fragment and an origin match condition describing the second selected fragment if the first selected fragment is not a template rule with a match attribute.

4. A computer-implemented method for editing a stylesheet, the stylesheet including rules, each rule having a stylesheet match condition, comprising:

receiving a selection of a first template fragment of the stylesheet, the first template fragment having a first stylesheet match condition;

receiving a selection of a first source node from a source document;

storing, in a cut buffer of a computer hardware device, a copy of the first template fragment, storing, in the cut buffer, an origin match condition describing the first source node, and upon the first stylesheet match condition matching the origin match condition performing a predefined editing operation upon the stylesheet, wherein the source document includes a tree structure having a plurality of nodes.

5. The method of claim 4, wherein the predefined editing operation includes removing, from the stylesheet, the first template fragment.

6. The method of claim 5, further comprising receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

7. The method of claim 4, further comprising receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

8. The method of claim 4, wherein the source document comprises eXtensible Mark-up Language (XML) and the stylesheet is an eXtensible Style Language Transformations (XSLT) stylesheet comprising a tree structure of XML transformation rules.

9. A computer hardware device for editing a stylesheet, the stylesheet including rules, each rule having a stylesheet match condition, comprising:

a memory;

a processor configured to perform:

receiving a selection of a first template fragment of the stylesheet, the first template fragment having a first stylesheet match condition;

receiving a selection of a first source node from a source document;

storing, in a cut buffer of the memory, a copy of the first template fragment, storing, in the cut buffer, an origin match condition describing the first source node, and upon the first stylesheet match condition matching the origin match condition performing a predefined editing operation upon the stylesheet, wherein the source document includes a tree structure having a plurality of nodes.

10. The computer hardware device of claim 9, wherein the predefined editing operation includes removing, from the stylesheet, the first template fragment.

11. The computer hardware device of claim 10, wherein the processor is further configured to perform receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

12. The computer hardware device of claim 9, wherein the processor is further configured to perform receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

13. The computer hardware device of claim 9, wherein the source document comprises eXtensible Mark-up Language (XML) and the stylesheet is an eXtensible Style Language Transformations (XSLT) stylesheet comprising a tree structure of XML transformation rules.

14. A computer program product including computer-readable storage medium having stored therein computer usable program code for editing a stylesheet, the stylesheet including rules, each rule having a stylesheet match condition, the computer usable program code, which when executed by a computer hardware device, causing the computer hardware device to perform:

receiving a selection of a first template fragment of the stylesheet, the first template fragment having a first stylesheet match condition;

receiving a selection of a first source node from a source document;

storing, in a cut buffer of a computer hardware device, a copy of the first template fragment, storing, in the cut buffer, an origin match condition describing the first source node, and upon the first stylesheet match condition matching the origin match condition performing a predefined editing operation upon the stylesheet, wherein the source document includes a tree structure having a plurality of nodes.

15. The computer program product of claim 14, wherein the predefined editing operation includes removing, from the stylesheet, the first template fragment.

16. The computer program product of claim 15, further comprising receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

17. The computer program product of claim 14, further comprising receiving a selection of a second template fragment of the stylesheet, the second template fragment having a second stylesheet match condition;

receiving a selection of a second source node from a source document;

upon the second stylesheet match condition matching a second origin match condition describing the second source node inserting, into the stylesheet and at a location of the second template fragment, a third template fragment configured to create a second result node corresponding to a first result node created by the first template fragment, wherein the first result node is created by transforming the first source node with the first template fragment, and the second result node is created by transforming the second source node with the third template fragment.

18. The computer program product of claim 14, wherein the source document comprises eXtensible Mark-up Language (XML) and the stylesheet is an eXtensible Style Language Transformations (XSLT) stylesheet comprising a tree structure of XML transformation rules.

\* \* \* \* \*